UNITED STATES PATENT OFFICE.

LOUIS L. JACKSON, OF NEW YORK, N. Y., ASSIGNOR OF ONE-HALF TO ODUS C. HORNEY, OF NEW YORK, N. Y.

PROCESS FOR DECOMPOSING SILICATES OF MAGNESIUM.

1,254,230.  Specification of Letters Patent.  Patented Jan. 22, 1918.

No Drawing.  Application filed January 19, 1917. Serial No. 143,242.

*To all whom it may concern:*

Be it known that I, LOUIS L. JACKSON, a citizen of the United States, residing at New York city, county of New York, and State of New York, have invented a new and useful Improvement in Processes for Decomposing Silicates of Magnesium, of which the following is a full, clear, and exact description.

The object of my invention is the decomposition of natural silicates of magnesium, especially those natural silicates which are not readily, or at all, decomposable by acids, the special purpose of the decomposition being the manufacture of useful products, such as magnesium sulfate, from such abundant silicates as talc and soapstone, the latter being available in large quantities as a waste product at the soapstone quarries.

It is known that of the many varieties of natural silicates of magnesium, some are decomposed by dilute acids, others by heating for a considerable time with comparatively concentrated acids, while many are described as not attacked by acids. In the last mentioned class occurs some of the most common silicates, *e. g.* soapstone (talc).

It is also known that if talc (metasilicate of magnesium, $H_2Mg_3Si_4O_{12}$) is intensely ignited over a blast lamp and the ignited product boiled with a solution of sodium carbonate, about 15% of $SiO_2$ (about one quarter of the entire silica content) goes into solution as sodium silicate, and an insoluble product is left to which the formula $MgSiO_3$ has been ascribed. The solution of sodium carbonate has no action on the talc before ignition. Acids are also without action on the talc before ignition; but the art discloses no information as to the action of acids on the insoluble product left after boiling with the solution of sodium carbonate.

I have found that if those natural silicates, such as talc, soapstone, chrysolite, etc., which are insoluble, or with difficulty soluble, in acids, are heated at a relatively low temperature with a large excess of caustic alkali, they are decomposed into an alkaline silicate and a silicate of magnesium which is readily soluble in acids, even in very dilute acids (for example, 1% sulfuric acid), or even diluted organic acids like acetic acid.

In the case of soapstone the reaction appears to be as shown by the following equation:

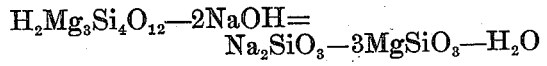

$$H_2Mg_3Si_4O_{12} - 2NaOH = Na_2SiO_3 - 3MgSiO_3 - H_2O$$

inasmuch as about one fourth of the total silica is found in solution as alkaline silicate.

To get satisfactory results at a comparatively low temperature it is necessary to use caustic alkali, not carbonate of an alkali, and to use the caustic alkali in large excess, more than twice what is required by theory to combine with the silica which is removed as alkaline silicate. For example: using twice the theoretical quantity of caustic alkali and heating even as high as 600° C. for two hours, only about one half of the soapstone is decomposed; while by using four times the theoretical amount, almost complete decomposition may be obtained in the same time at 350° C., or even at a lower temperature. As the caustic alkali is recovered and used over again, there is no objection to using this large excess.

Although good decomposition can be obtained below 350° C., the solution of magnesium salt obtained from the product heated much below that temperature contains considerable iron, while the product obtained at 350° C. or higher will yield a solution almost free from iron, if proper care in the addition of the acid is observed. As indicated above, good results can be obtained at temperatures much above 350° C., but I prefer to work at about the latter temperature.

Working in a small way, it is convenient to use fused caustic alkali, adding just enough water to cause the caustic alkali to melt at any convenient temperature, say 150° C., then stir in the powdered silicate and raise the temperature to the desired point. In manufacturing practice the caustic alkali would be recovered in dilute solution, not over 10%, and would be concentrated and used over again. The example given below is in accordance with the manufacturing practice.

100 parts of powdered soapstone are stirred into a hot solution of caustic soda, as concentrated as it is practicable to get it, and representing about 80 parts of sodium hydrate, and the mass is then subjected to a heat of about 350° C. for about two hours. The product is extracted with water to remove the alkaline silicate and the excess of caustic alkali.

The caustic alkali is recovered from the filtrate and washings in any desired manner and the dilute solution of caustic concentrated and used over again.

The residue from this washing consists essentially of a silicate of magnesium. This is suspended in water and sufficient acid added to combine with the magnesium. Any acid may be used that will give a soluble magnesium salt. The magnesium salt is recovered from the solution by filtration.

The residue from this filtration, which consists essentially of silica in a very finely divided state mixed with hydrated ferric oxid, is washed, and the washings are joined with the filtrate containing the magnesium salt. The magnesium salt may be recovered from the solution so obtained.

Further data with respect to two experiments selected from the large number made are given below.

1. Soapstone 100 parts; sodium hydroxid 80 parts. Silica dissolved 13.22 parts; MgO made soluble 24.50 parts.

2. Asbestos (so called: apparently Canadian chrysotile) 100 parts; sodium hydroxid 80 parts. Silica dissolved 7.5 parts; MgO made soluble 28.06 parts.

Having now fully described my invention, what I desire to claim and protect by Letters Patent is:

1. The process of decomposing those silicates of magnesium which are resistant to the action of acids, which consists in heating an admixture of the silicate and a hydrate of an alkali metal, and treating the insoluble part of the product with an acid.

2. The process of decomposing those silicates of magnesium which are resistant to the action of acids, which consists in heating an admixture of the silicate and a hydrate of an alkali metal, thereby forming an alkaline silicate and an insoluble product, separating out the alkaline silicate, treating the insoluble residue with an acid to decompose the same, separating out the magnesium salt, washing the residue, and joining the washings and the magnesium salt so separated out.

3. The process of decomposing soapstone which consists in heating an admixture of soapstone and sodium hydroxid, separating out the dissolved silica, and treating the insoluble residue with a dilute acid.

In testimony of which invention, I have hereunto set my hand, at New York city, on this 15th day of January, 1917.

LOUIS L. JACKSON.